United States Patent
Kawahara et al.

(10) Patent No.: US 8,939,618 B2
(45) Date of Patent: Jan. 27, 2015

(54) LIGHT FLUX CONTROLLING MEMBER, LIGHT EMITTING APPARATUS, AND ILLUMINATION APPARATUS

(71) Applicant: Enplas Corporation, Saitama (JP)

(72) Inventors: Noriyuki Kawahara, Saitama (JP); Akinobu Seki, Saitama (JP)

(73) Assignee: Enplas Corporation, Saitama (JP)

( * ) Notice: Subject to any disclaimer, the term of this patent is extended or adjusted under 35 U.S.C. 154(b) by 121 days.

(21) Appl. No.: 13/895,644

(22) Filed: May 16, 2013

(65) Prior Publication Data

US 2013/0308320 A1 Nov. 21, 2013

(30) Foreign Application Priority Data

May 17, 2012 (JP) ................. 2012-113463

(51) Int. Cl.
| | |
|---|---|
| *F21V 17/06* | (2006.01) |
| *F21V 5/04* | (2006.01) |
| *G02B 19/00* | (2006.01) |
| *G02B 7/02* | (2006.01) |

(52) U.S. Cl.
CPC .............. *F21V 5/04* (2013.01); *G02B 19/0066* (2013.01); *G02B 19/0071* (2013.01); *G02B 7/022* (2013.01); *G02B 19/0014* (2013.01)
USPC ........................ 362/433; 362/335; 362/311.09

(58) Field of Classification Search
USPC ........................ 362/311.09, 335, 433, 311.1
See application file for complete search history.

(56) References Cited

U.S. PATENT DOCUMENTS

| | | | |
|---|---|---|---|
| 8,213,093 B2* | 7/2012 | Bak et al. ...................... | 359/718 |
| 2009/0052192 A1* | 2/2009 | Kokubo et al. .......... | 362/311.09 |

FOREIGN PATENT DOCUMENTS

JP 2010-165683 A 7/2010

* cited by examiner

*Primary Examiner* — Evan Dzierzynski
(74) *Attorney, Agent, or Firm* — Brundidge & Stanger, P.C.

(57) ABSTRACT

Light flux controlling member (140) includes: light controlling emission surface (141) for controlling the distribution of light emitted from light emitting element (130); back surface (143) that is positioned on a side opposite light controlling emission surface (141); boss (145) that is formed on back surface (143) side; and annular concave part (146) that is formed in the vicinity of a base end of boss (145). Annular concave part (146) has inside surface (146*a*) that is smoothly connected to an outer peripheral surface of the base end of boss (145) and that has an arc-shaped cross-section in an axial direction of boss (145).

6 Claims, 10 Drawing Sheets

LIGHT FLUX CONTROLLING MEMBER, LIGHT EMITTING APPARATUS, AND ILLUMINATION APPARATUS

CROSS REFERENCE TO RELATED APPLICATIONS

This application is entitled and claims the benefit of Japanese Patent Application No. 2012-113463, filed on May 17, 2012, the disclosure of which including the specification, drawings and abstract is incorporated herein by reference in its entirety.

TECHNICAL FIELD

The present invention relates to a light flux controlling member that controls the distribution of light emitted from a light emitting element. In addition, the present invention relates to a light emitting apparatus having the light flux controlling member and an illumination apparatus having the light emitting apparatus.

BACKGROUND ART

In a transmission type image display apparatus such as a liquid crystal display apparatus, a direct type planar light source apparatus may be used as a back light unit. Recently, a direct type planar light source apparatus having a plurality of light emitting elements as a light source has been used.

For example, the direct type planar light source apparatus includes a substrate, light emitting elements, light flux controlling members (expanding lenses), and a light diffusion member (diffuser plate). The light emitting elements are arranged on the substrate in a matrix pattern. The light flux controlling members are arranged on the respective light emitting elements. The light flux controlling members spread light emitted from the respective light emitting elements in a plane direction of the substrate. Light emitted from the light flux controlling members is diffused by the light diffusion member to illuminate an illumination target member (for example, a liquid crystal panel) in a plane shape.

When the light flux controlling members are positioned on the substrate, positioning bosses (convex parts) may be formed in the bottoms of the light flux controlling members to insert these bosses into holes formed on the substrate (for example, refer to Patent Literature (hereinafter, abbreviated as PTL) 1).

PTL 1 discloses a lens body including lenses and support parts for positioning the lenses on a substrate. Columnar convex parts (bosses) are formed on a contact surface (a surface in contact with the substrate) of the support parts, and through holes corresponding to the convex parts are formed on the substrate. By inserting the convex parts of the support parts of the lens body into the through holes formed on the substrate, the lens body (plurality of lenses) is positioned on the substrate.

CITATION LIST

Patent Literature

PTL 1
Japanese Patent Application Laid-Open No. 2010-165683

SUMMARY OF INVENTION

Technical Problem

In the positioning method of the related art, as illustrated in FIG. 1A, light flux controlling member 10 is positioned on substrate 20 by inserting columnar boss 14, which protrudes from contact surface 12 of light flux controlling member 10, into columnar through hole 22 of substrate 20 such that contact surface 12 comes into contact with substrate 20. Next, by welding substrate 20 and a portion of boss 14 which protrudes from back surface 24 of the substrate, light flux controlling member 10 may be fixed onto substrate 20. When such light flux controlling member 10 fixed onto substrate 20 is placed in a high temperature environment, the expansion of light flux controlling member 10 becomes greater than that of substrate 20 due to the difference between linear expansion coefficients of light flux controlling member 10 and substrate 20. As a result, boss 14 may be broken by the stress concentrated on edges (indicated by arrows in FIG. 1A) of a base end of boss 14.

As a countermeasure to solve the above-described problem, a configuration is considered in which the edges (indicated by arrows in FIG. 1B) of the base end of boss 14 are formed in a round shape as illustrated in FIG. 1B. By forming the edges of the base end of boss 14 in a round shape, the concentration of the stress is prevented and the breakage of boss 14 can be suppressed. However, when the edges of the base end of boss 14 are formed in a round shape, a gap is generated between contact surface 12 of light flux controlling member 10 and substrate 20. As a result, it is difficult to position light flux controlling member 10 on substrate 20 appropriately.

An object of the present invention is to provide a light flux controlling member in which the strength of a boss is improved while maintaining the positioning accuracy of the light flux controlling member. In addition, another object of the present invention is to provide a light emitting apparatus having the light flux controlling member and an illumination apparatus having the light emitting apparatus.

Solution to Problem

In order to achieve the above-described objects, according to an aspect of the present invention, there is provided a light flux controlling member including: a light controlling emission surface that controls the distribution of light emitted from a light emitting element; a back surface that is positioned on a side opposite the light controlling emission surface; a positioning boss that is formed on the back surface side; and an annular concave part that is formed to surround a base end of the boss, in which the annular concave part has an inside surface that is smoothly connected to an outer peripheral surface of the base end of the boss and that has an arc-shaped cross-section in an axial direction of the boss.

According to another aspect of the present invention, there is provided a light emitting apparatus including: a light emitting element; and the light flux controlling member according to the aspect.

According to still another aspect of the present invention, there is provided an illumination apparatus including: the light emitting apparatus according to the aspect; and an illumination target surface that is to be irradiated with light emitted from the light emitting apparatus.

Advantageous Effects of Invention

In the light flux controlling member according to the aspect of the present invention, since the stress is not concentrated on the base end of the boss, the strength of the boss is superior. In addition, in the light flux controlling member according to the aspect of the present invention, since the contact surface in the vicinity of the base end of the boss can be formed in a planar shape, the positioning accuracy of the light flux controlling member on the substrate can be maintained.

DESCRIPTION OF EMBODIMENTS

Figure 1A:
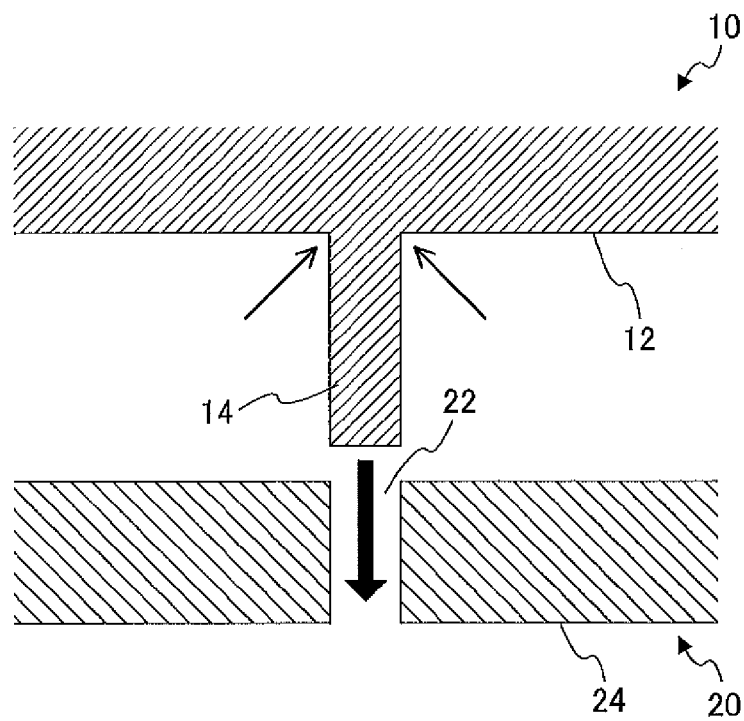
FIGS. 1A and 1B are enlarged cross-sectional views illustrating a part of a light flux controlling member and a substrate in order to describe problems of a light flux controlling member of the related art.
Figure 1B:
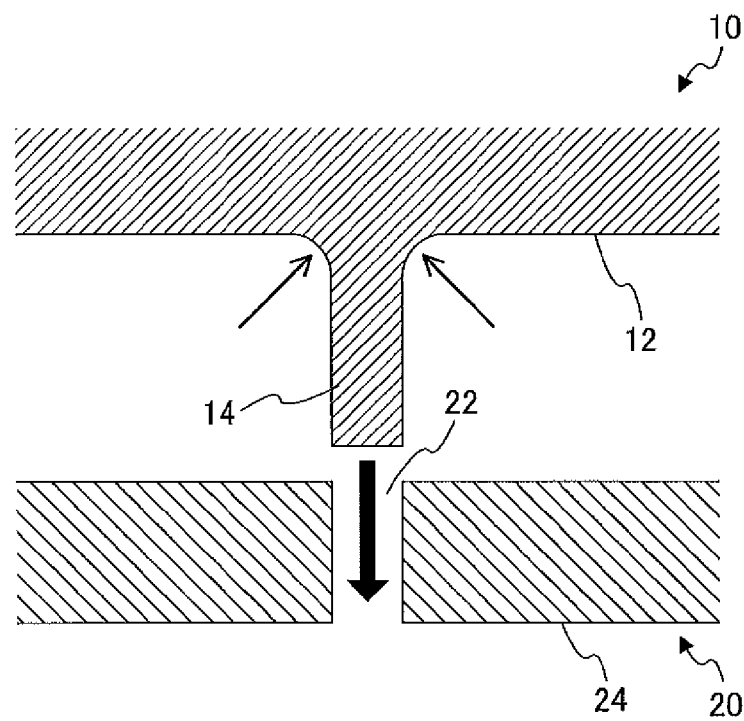

Hereinafter, embodiments of the present invention will be described in detail referring to the drawings. In the following explanation, as a representative example of an illumination apparatus according to the present invention, a planar light source apparatus which is suitable for a back light unit of a liquid crystal display apparatus will be described. A combination of this planar light source apparatus with an illumination target member (for example, a liquid crystal panel) that is to be illuminated with light emitted from the planar light source apparatus can be used as a display apparatus.

Embodiment 1

(Configurations of Illumination Apparatus and Light Emitting Apparatus)

Figure 2:
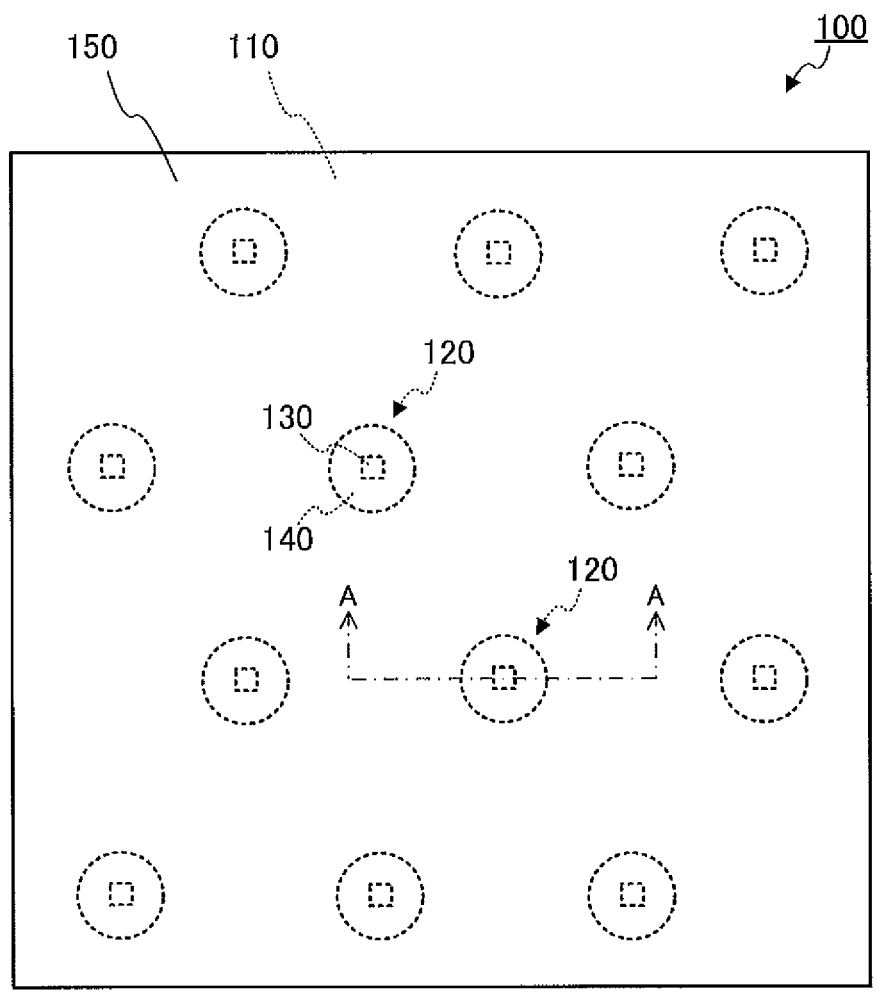
FIG. 2 is a plan view illustrating a planar light source apparatus according to Embodiment 1.
Figure 3:
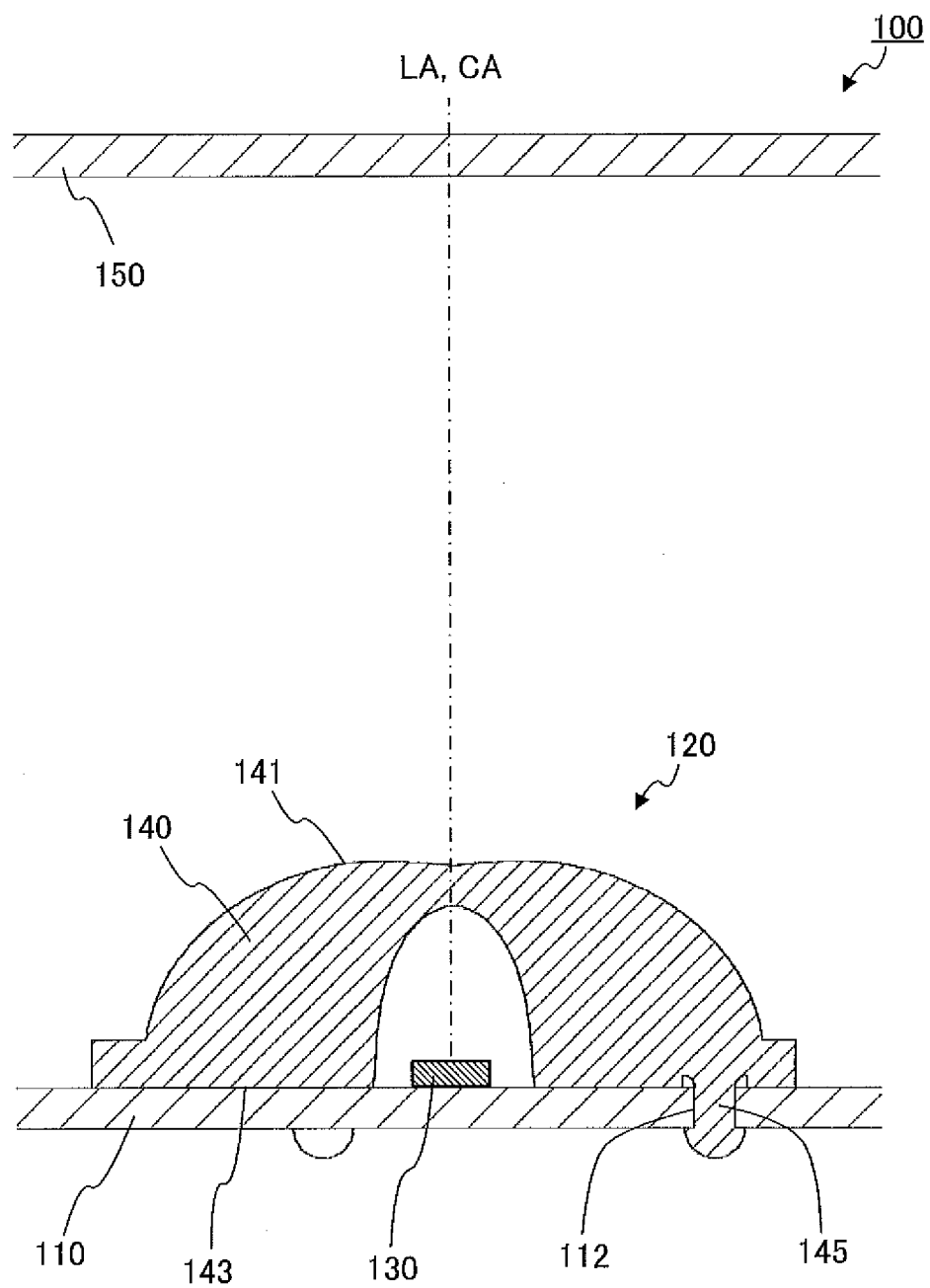
FIG. 3 is a cross-sectional view taken along line A-A of FIG. 2.

FIG. 2 is a plan view illustrating a configuration of a planar light source apparatus according to Embodiment 1 of the present invention. FIG. 3 is a cross-sectional view taken along line A-A of FIG. 2.

As illustrated in FIGS. 2 and 3, planar light source apparatus 100 according to Embodiment 1 includes substrate 110, light emitting apparatuses 120, and light diffusion member 150.

The light emitting apparatuses 120 are arranged on substrate 110 in a predetermined arrangement at predetermined intervals. Each of the light emitting apparatuses 120 includes light emitting element 130 and light flux controlling member 140.

Substrate 110 is a rectangular plate that supports light emitting apparatus 120. On substrate 110, through holes 112 for positioning light flux controlling members 140 are formed. The shape of through hole 112 is not particularly limited and is, for example, approximately columnar.

Light emitting element 130 is a light source of planar light source apparatus 100 (and light emitting apparatus 120) and is fixed onto substrate 110. For example, light emitting element 130 is a light emitting diode (LED) such as a white light emitting diode.

Light flux controlling member 140 is an expanding lens that controls the travelling direction of light emitted from light emitting element 130. Light flux controlling member 140 is arranged on light emitting element 130 such that central axis CA of light controlling emission surface 141 (described below) matches with optical axis LA of light emitting element 130. Light flux controlling member 140 includes positioning boss (convex part) 145 on a side of back surface 143 (side of substrate 110). As described below, after fixing light emitting element 130 onto substrate 110, boss 145 of light flux controlling member 140 is inserted into through hole 112 of substrate 110. As a result, light flux controlling member 140 is positioned on an appropriate position of substrate 110 (refer to FIG. 6A). Next, by welding a tip portion of boss 145, protruding from the back surface side of substrate 110, onto the back surface of substrate 110, light flux controlling member 140 is fixed onto an appropriate position of substrate 110 (refer to FIG. 6B).

Light flux controlling member 140 is formed by integral molding. A material of light flux controlling member 140 is not particularly limited as long as light having a desired wavelength passes through the material. Examples of the material of light flux controlling member 140 include light-permeable resins such as polymethyl methacrylate (PMMA), polycarbonate (PC), and epoxy resin (EP); and glass.

Planar light source apparatus 100 according to Embodiment 1 has major characteristics in a configuration of light flux controlling member 140. Therefore, light flux controlling member 140 will be described in detail separately.

Light diffusion member 150 is a light-diffusing plate-like member and diffuses light emitted from light flux controlling member 140 while causing the light to pass therethrough. Normally, light diffusion member 150 has substantially the same size as that of an illumination target member such as a liquid crystal panel. For example, light diffusion member 150 is formed of a light-permeable resin such as polymethyl methacrylate (PMMA), polycarbonate (PC), polystyrene (PS), or styrene-methyl methacrylate copolymer resin (MS). In order to impart the light-diffusing property, fine irregularities may be formed on a surface of light diffusion member 150; or light diffusers such as beads may be dispersed in light diffusion member 150.

In planar light source apparatus 100 according to Embodiment 1, light emitted from each of light emitting elements 130 is spread by light flux controlling member 140 in a plane direction of substrate 110 and is further diffused by light diffusion member 150. As a result, planar light source apparatus 100 according to Embodiment 1 can uniformly irradiate a planar irradiated member (for example, a liquid crystal panel) with light.

(Configuration of Light Flux Controlling Member)

Figure 4A:
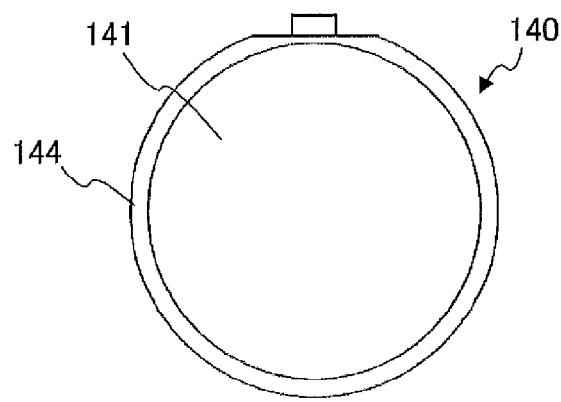
FIGS. 4A to 4C are diagrams illustrating a configuration of the light flux controlling member according to Embodiment 1.
Figure 4B:
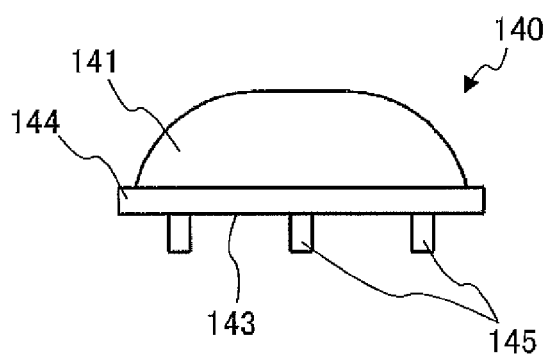
Figure 4C:
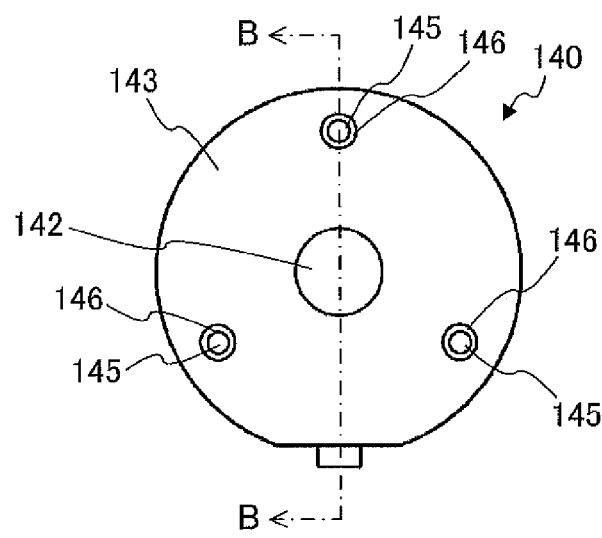
Figure 5A:
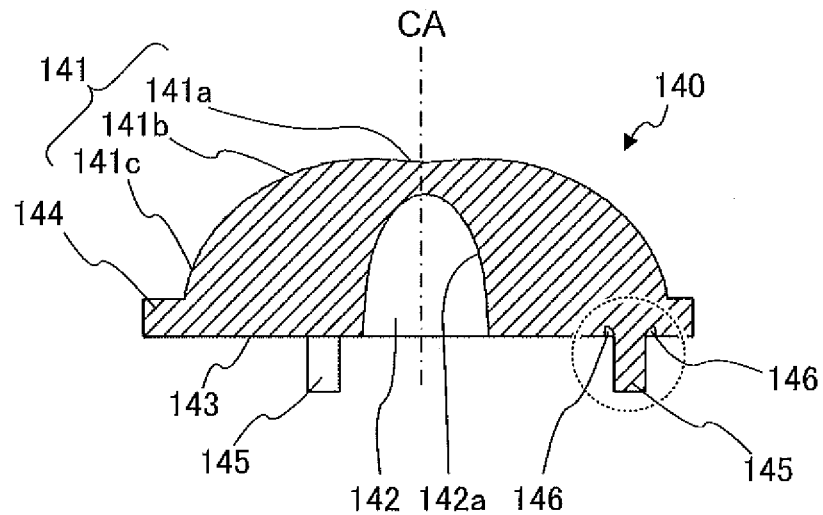
FIGS. 5A and 5B are cross-sectional views taken along line B-B of FIG. 4C.
Figure 5B:
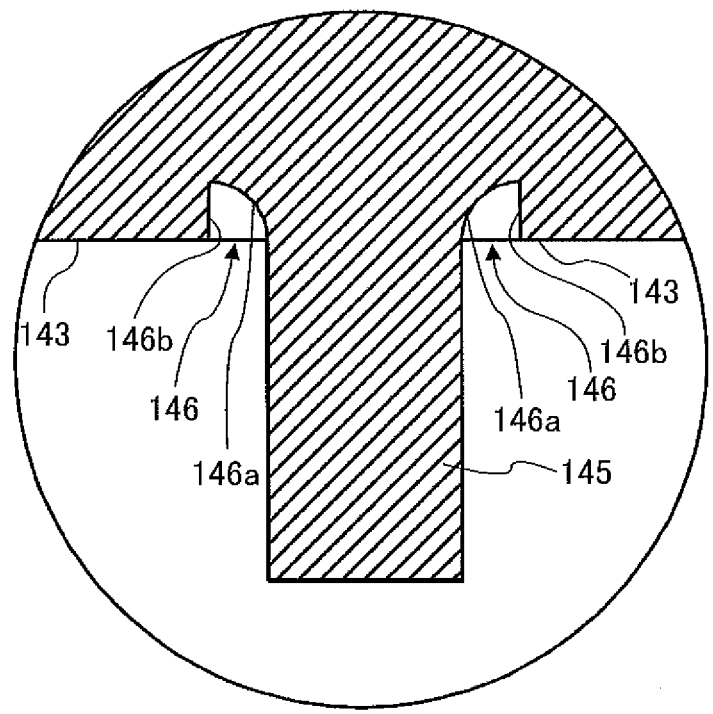

FIGS. 4 and 5 illustrate a configuration of light flux controlling member 140 according to Embodiment 1. FIG. 4A is a plan view of light flux controlling member 140, FIG. 4B is a front view of light flux controlling member 140, and FIG. 4C is a bottom view of light flux controlling member 140. In addition, FIG. 5A is a cross-sectional view taken along line B-B of FIG. 4C, and FIG. 5B is an enlarged diagram illustrating a part indicated by a broken line in FIG. 5A.

As illustrated in FIGS. 4A to 4C and FIGS. 5A and 5B, light flux controlling member 140 includes light controlling emission surface 141, concave part 142, back surface 143, flange 144, bosses 145, and annular concave parts 146.

Light controlling emission surface 141 controls the distribution of light emitted from light emitting element 130 into light flux controlling member 140. Light controlling emission surface 141 is a rotationally symmetric surface about central axis CA (refer to FIGS. 4A and 4B and FIG. 5A) and protrudes upward from flange 144.

Light controlling emission surface 141 includes first emission surface 141a that is positioned in a predetermined range centering on central axis CA of light controlling emission surface 141; second emission surface 141b that continuously surrounds first emission surface 141a; and third emission surface 141c that connects second emission surface 141b to flange 144. First emission surface 141a is a smoothly curved surface that is convex downward (on the side of light emitting element 130). The shape of first emission surface 141a is a concave shape obtained by cutting a part of a spherical surface. Second emission surface 141b is a smoothly curved surface that surrounds first emission surface 141a and is convex upward. The shape of second emission surface 141b is a convex shape obtained by cutting a part of an annular surface. Third emission surface 141c is a curved surface that surrounds second emission surface 141b. The cross-section of third emission surface 141c may be linear or curved in the cross-sectional view of FIG. 5A.

Concave part 142 is formed in the center of the lower side of light flux controlling member 140 (the side of light emitting element 130). The inner surface of concave part 142 functions as incident surface 142a. Incident surface 142a causes most of light, emitted from light emitting element 130, to be incident on the inside of light flux controlling member 140 while controlling a travelling direction thereof. Incident surface 142a is a rotationally symmetric surface which is concave. The central axis of incident surface 142a matches with central axis CA of light controlling emission surface 141.

Back surface 143 is positioned on a side opposite to light controlling emission surface 141 and is a plane that radially extends from an open rim portion of concave part 142. In light flux controlling member 140 according to this embodiment, back surface 143 is a contact surface in contact with substrate 110 (refer to FIG. 3).

Flange 144 is positioned between an outer peripheral portion of light controlling emission surface 141 and an outer peripheral portion of back surface 143, and protrudes radially outward. The shape of flange 144 is substantially annular. Flange 144 is not necessarily provided. However, by providing flange 144, the handleability and positioning of light flux controlling member 140 is facilitated. The thickness of flange 144 is not particularly limited and is determined in consideration of, for example, the area required for light controlling emission surface 141 and the moldability of flange 144.

Boss 145 is formed to protrude from back surface 143 in a direction perpendicular to back surface 143 and is a convex part for positioning light flux controlling member 140 on substrate 110. As described below, by inserting boss 145 into through hole 112 of substrate 110, light flux controlling member 140 is positioned on an appropriate position of substrate 110. In an example illustrated in FIG. 4C, three bosses 145 are formed on an outer peripheral portion of back surface 143 such that the distances between centers thereof are the same. The number of bosses 145 is not particularly limited as long as light flux controlling member 140 is appropriately positioned on substrate 110.

The shape of boss 145 is not particularly limited and may appropriately be selected according to the shape of through hole 112 formed on substrate 110. In light flux controlling member 140 according to this embodiment, both through hole 112 and boss 145 have an approximately columnar shape. In this case, the diameter of boss 145 is slightly smaller than that of through hole 112.

Annular concave part 146 is an annular groove that is formed on back surface 143 so as to surround an base end of boss 145 (a portion connecting boss 145 and back surface 143). The number of annular concave parts 146 is the same as that of bosses 145. The shape of annular concave part 146 is a rotationally symmetric shape about the central axis of boss 145. Annular concave part 146 includes at least inside surface 146a and outside surface 146b.

Inside surface 146a is a side surface on the inside (the side of boss 145) of annular concave part 146. Inside surface 146a has a round shape that is smoothly connected to an outer peripheral surface of a base end of boss 145. As illustrated in FIG. 5B, when annular concave part 146 is cut in an axial direction of boss 145, the cross-sectional shape of inside surface 146a is an arc shape (for example, a circular arc shape or an elliptical arc shape). In this way, by forming inside surface 146a in a round shape, even when a force is applied to boss 145, the concentration of the stress on the base end of boss 145 can be prevented.

Outside surface 146b is a side surface on the outside of annular concave part 146. Outside surface 146b is positioned between inside surface 146a and back surface 143. The shape of outside surface 146b is not particularly limited. In an example illustrated in FIG. 5B, the shape of outside surface 146b is approximately cylindrical. As illustrated in FIG. 5B, when annular concave part 146 is cut in the axial direction of boss 145, the cross-sectional shape of outside surface 146b may be linear or curved (for example, arc-shaped).

In addition, a bottom may be provided between inside surface 146a and outside surface 146b. In this case, the shape of the bottom is not particularly limited. For example, the bottom may have a planar shape.

(Fixing Method of Light Flux Controlling Member)

Figure 6A:
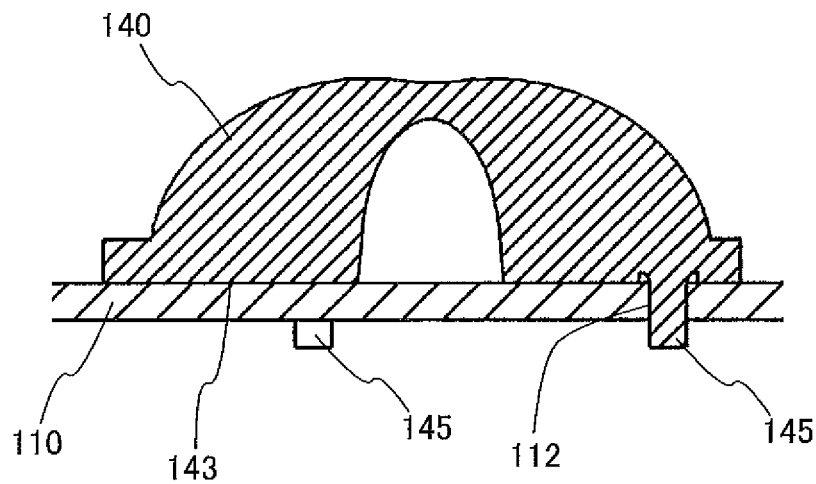
FIGS. 6A and 6B are cross-sectional views illustrating a fixing method of the light flux controlling member according to Embodiment 1.
Figure 6B:
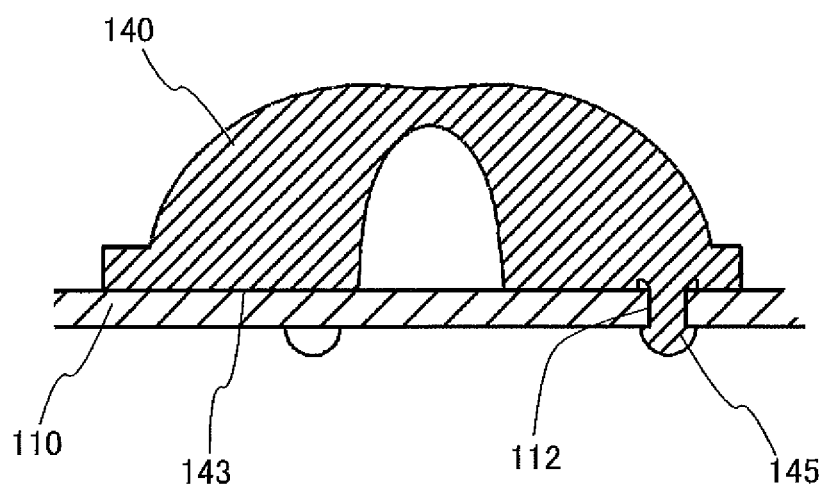

FIGS. 6A and 6B are cross-sectional views illustrating a method of fixing light flux controlling member 140 onto substrate 110. In FIGS. 6A and 6B, light emitting element 130 is not illustrated.

As illustrated in FIG. 6A, boss 145 of light flux controlling member 140 is inserted into through hole 112 formed on substrate 110 to position light flux controlling member 140 on a predetermined position of substrate 110. At this time, back surface 143 of light flux controlling member 140 is in planar contact with substrate 110. Next, as illustrated in FIG. 6B, light flux controlling member 140 is fixed onto substrate 110 by welding a portion of boss 145 and the back surface of substrate 110, the portion protruding from the back surface of substrate 110.

Through the above-described processes, light flux controlling member 140 can be fixed onto a predetermined position of substrate 110. In light emitting apparatus 120 manufactured in this way, a portion connecting boss 145 and back surface 143 is formed in a round shape. Therefore, even when the stress is applied to boss 145 in a high temperature environment, the stress is not concentrated on the base end of boss 145 and thus boss 145 is not broken.

(Advantageous Effects)

In light flux controlling member 140 according to Embodiment 1, since the stress is not concentrated on the base end of boss 145, the strength of boss 145 is superior. In addition, since the contact surface (back surface 143) in the vicinity of the base end of boss 145 is formed in a planar shape, light flux controlling member 140 according to Embodiment 1 can be positioned on substrate 110 with high accuracy.

Embodiment 2

A planar light source apparatus and a light emitting apparatus according to Embodiment 2 of the present invention are different from planar light source apparatus 100 and light emitting apparatus 120 according to Embodiment 1, in that light flux controlling member 240 according to Embodiment 2 is provided instead of light flux controlling member 140 according to Embodiment 1. Therefore, in this embodiment, only light flux controlling member 240 according to Embodiment 2 will be described.

(Configuration of Light Flux Controlling Member)

Figure 7A:
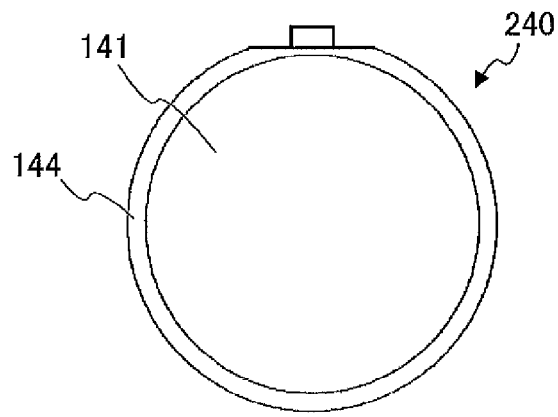
FIGS. 7A to 7C are diagrams illustrating a configuration of a light flux controlling member according to Embodiment 2.
Figure 7B:
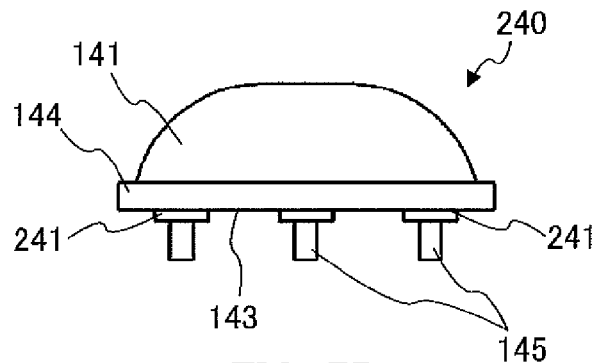
Figure 7C:
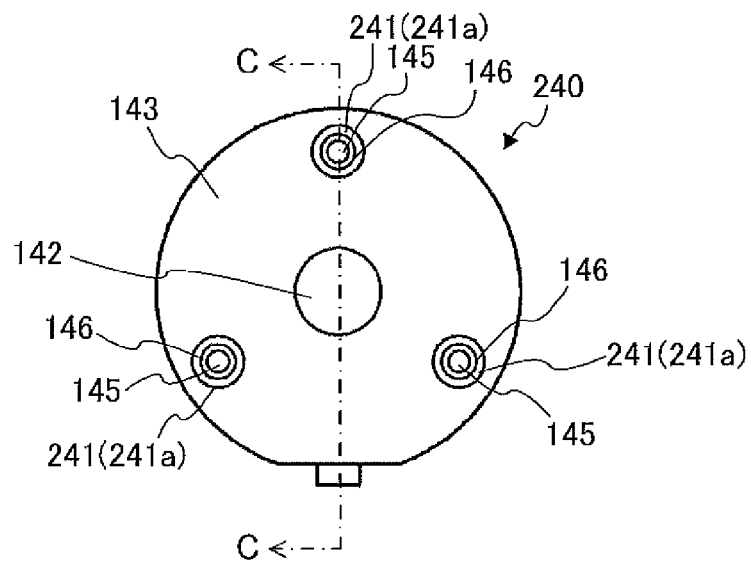
Figure 8A:
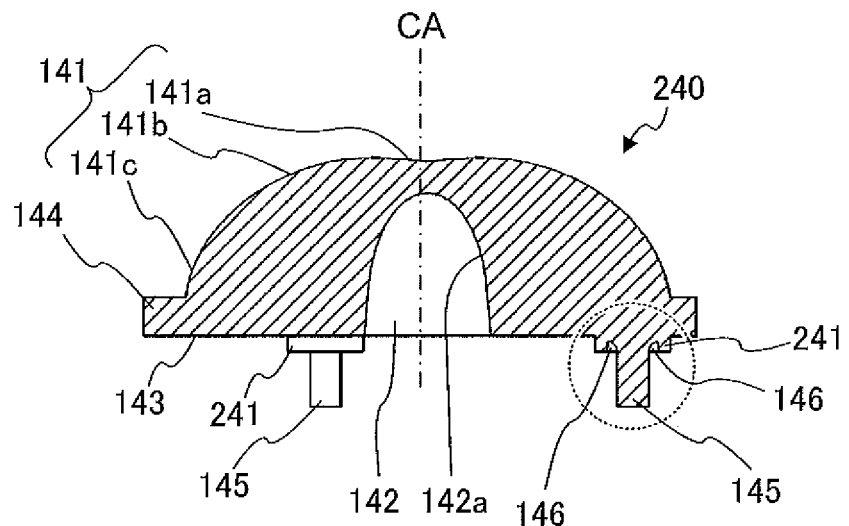
FIGS. 8A and 8B are cross-sectional views taken along line C-C of FIG. 7C.
Figure 8B:
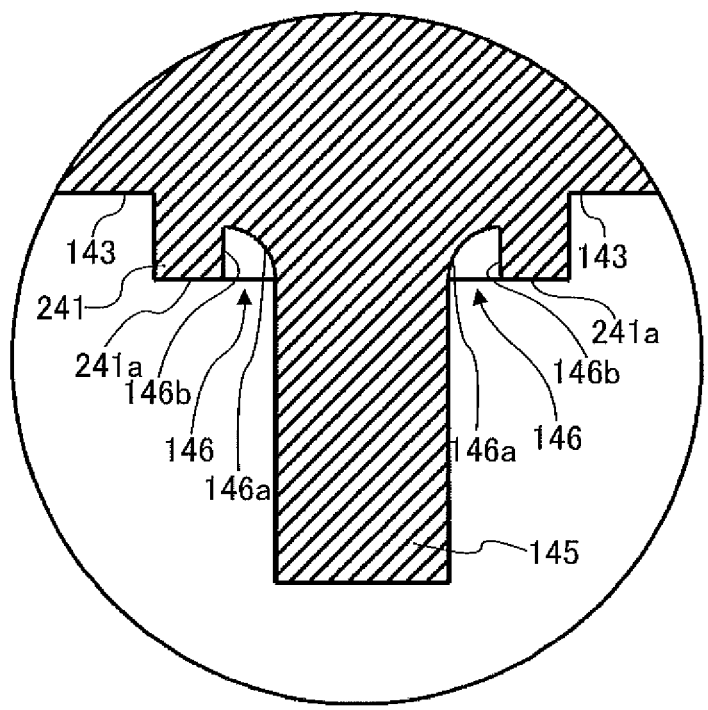

FIGS. 7A to 7C and FIGS. 8A and 8B are diagrams illustrating a configuration of light flux controlling member 240 according to Embodiment 2. FIG. 7A is a plan view of light flux controlling member 240, FIG. 7B is a front view of light flux controlling member 240, and FIG. 7C is a bottom view of light flux controlling member 240. In addition, FIG. 8A is a cross-sectional view taken along line C-C of FIG. 7C, and FIG. 813 is an enlarged diagram illustrating a part indicated by a broken line in FIG. 8A. The same components as those of light flux controlling member 140 according to Embodiment 1 are represented by the same reference numerals, and the explanation thereof will not be repeated.

As illustrated in FIGS. 7A to 7C and FIGS. 8A and 8B, light flux controlling member 240 includes light controlling emission surface 141, concave part 142, back surface 143, flange 144, seat 241, bosses 145, and annular concave parts 146.

Seat 241 is formed to protrude from back surface 143 in a direction perpendicular to back surface 143 and is a convex portion for adjusting the position (height) of light flux controlling member 240 with respect to light emitting element 130. Seat 241 also has a function of forming a gap between substrate 110 and back surface 143 of light flux controlling member 240 to dissipate heat, generated from light emitting element 130, outside. The shape of seat 241 is not particularly limited. In an example of FIG. 7C, the shape of seat 241 is columnar. In light flux controlling member 240 according to this embodiment, top end surface 241a (surface parallel to back surface 143) of seat 241 is a contact surface in contact with substrate 110 (refer to FIG. 9). The width and height of seat 241 may be appropriately adjusted according to the purposes.

In light flux controlling member 240 according to Embodiment 2, boss 145 is formed to protrude from contact surface 241a of seat 241. In addition, annular concave part 146 is formed on contact surface 241a of seat 241, not on back surface 143. At this time, the depth of annular concave part 146 and the height of seat 241 are adjusted such that the depth of annular concave part 146 from contact surface 241a is less than the height of seat 241. Therefore, annular concave part 146 is positioned closer to the side of substrate 110 than back surface 143 and thus does not easily interfere with an optical path inside light flux controlling member 240.

(Fixing Method of Light Flux Controlling Member)

Figure 9A:
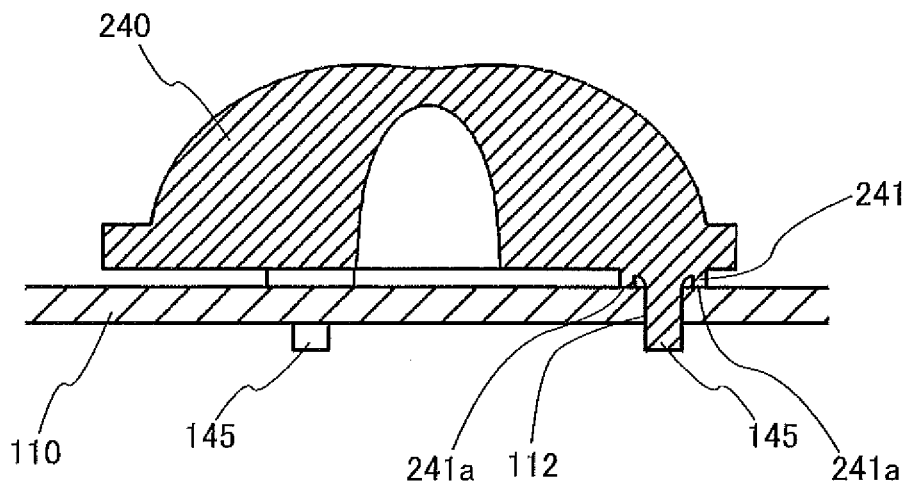
FIGS. 9A and 9B are cross-sectional views illustrating a fixing method of the light flux controlling member according to Embodiment 2.
Figure 9B:
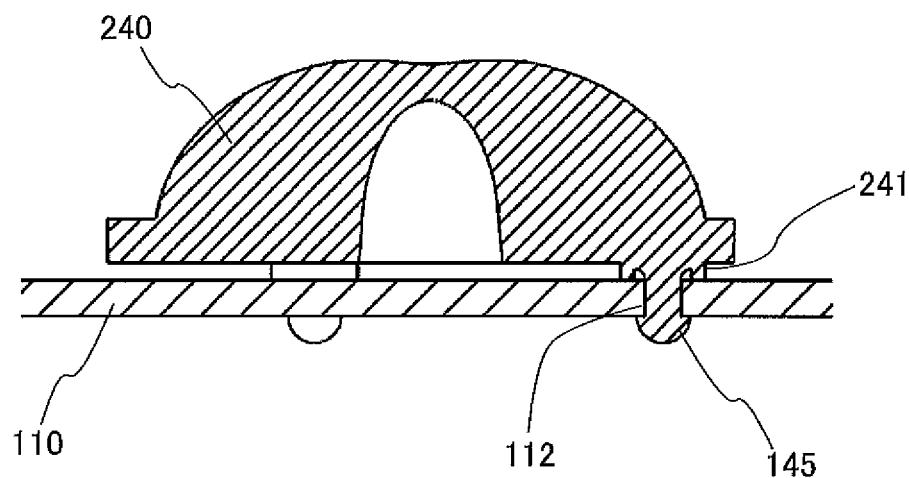

FIGS. 9A and 9B are cross-sectional views illustrating a method of fixing light flux controlling member 240 onto substrate 110. In FIG. 9, light emitting element 130 is not illustrated.

As illustrated in FIG. 9A, boss 145 of light flux controlling member 240 is inserted into through hole 112 formed on substrate 110 to position light flux controlling member 240 on a predetermined position of substrate 110. At this time, contact surface 241a of seat 241 is in planar contact with substrate 110. Next, as illustrated in FIG. 9B, light flux controlling member 240 is fixed onto substrate 110 by welding a portion of boss 145 and the back surface of substrate 110, the portion protruding from the back surface of substrate 110.

Through the above-described processes, light flux controlling member 240 can be fixed onto a predetermined position of substrate 110. In light emitting apparatus 120 manufactured in this way, a portion connecting boss 145 and seat 241 is formed in a round shape. Therefore, even when the stress is applied to boss 145 in a high temperature environment, the stress is not concentrated on the base end of boss 145 and thus boss 145 is not broken.

(Advantageous Effects)

Light flux controlling member 240 according to Embodiment 2 has the same advantageous effects as that of light flux controlling member 140 according to Embodiment 1. In light flux controlling member 240 according to Embodiment 2, annular concave part 146 is formed on seat 241, not on the main body of light flux controlling member 140 (a portion between light controlling emission surface 141 and back surface 143). The influence of light flux controlling member 240 on optical characteristics can be suppressed to the minimum, and thus the advantageous effects of the present invention can be exhibited.

In the above-described respective embodiments, the case in which the light flux controlling member according to the present invention is an expanding lens has been described. However, the light flux controlling member according to the present invention is not limited to the expanding lens. For example, the light flux controlling member according to the present invention may be a condenser lens.

Figure 10A:
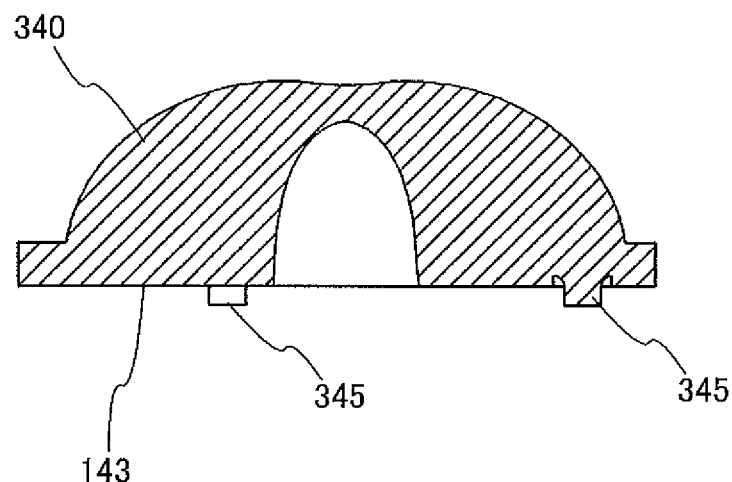
FIGS. 10A and 10B are cross-sectional views illustrating a modification example of the fixing method of the light flux controlling member according to Embodiment 2.
Figure 10B:
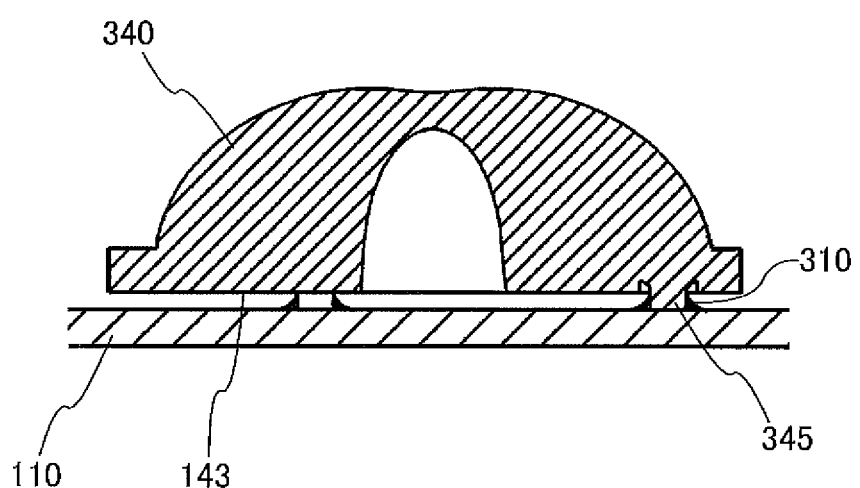

In addition, in the above-described respective embodiments, the case in which the boss of the light flux controlling member is inserted into the through hole of the substrate to fix the light flux controlling member onto the substrate has been described. However, the fixing method of the light flux controlling member is not limited thereto. FIGS. 10A and 10B are cross-sectional views illustrating a modification example of the method of fixing the light flux controlling member onto the substrate. As illustrated in FIGS. 10A and 10B, when light flux controlling member 340 includes short boss 345, the bottom of boss 345 may be brought into contact with the surface of substrate 110, onto which light emitting element 130 is fixed, and may be bonded thereto by adhesive 310, thereby fixing light flux controlling member 340 onto substrate 110.

INDUSTRIAL APPLICABILITY

The light flux controlling member, the light emitting apparatus, and the illumination apparatus according to the present invention are applicable to, for example, a back light unit of a liquid crystal display apparatus or a general illumination.

REFERENCE SIGNS LIST

10 Light flux controlling member
12 Contact surface
14 Boss
20 Substrate
22 Through hole
24 Back surface
100 Planar light source apparatus
110 Substrate
112 Through hole
120 Light emitting apparatus 130 Light emitting element
140, 240, 340 Light flux controlling member
141 Light controlling emission surface
141a First emission surface
141b Second emission surface
141c Third emission surface
142 Concave part
142a Incident surface
143 Back surface
144 Flange
145, 345 Boss
146 Annular concave part
146a Inside surface
146b Outside surface
150 Light diffusion member
241 Seat
241a Top end surface of seat (contact surface)
310 Adhesive
LA Optical axis of light emitting element
CA Central axis of light controlling emission surface

The invention claimed is:

1. A light flux controlling member comprising:
a light controlling emission surface for controlling the distribution of light emitted from a light emitting element;
a back surface that is positioned on a side opposite to the light controlling emission surface;
a positioning boss that is formed on the back surface side; and
an annular concave part that is formed to surround a base end of the boss,
wherein the annular concave part has an inside surface that is smoothly connected to an outer peripheral surface of the base end of the boss and that has an arc-shaped cross-section in an axial direction of the boss.

2. The light flux controlling member according to claim 1, wherein:
a seat is formed on the back surface to protrude from the back surface;
the boss is formed to protrude from a top end surface of the seat; and
the annular concave part is formed on the top end surface of the seat.

3. The light flux controlling member according to claim 2, wherein:
the depth of the annular concave part from the top end surface is less than the height of the seat.

4. The light flux controlling member according to claim 1, wherein:
the boss is formed to protrude from the back surface; and
the annular concave part is formed on the back surface.

5. A light emitting apparatus comprising:
a light emitting element; and
the light flux controlling member according to claim 1.

6. An illumination apparatus comprising:
the light emitting apparatus according to claim 5; and
an illumination target surface that is to be irradiated with light emitted from the light emitting apparatus.

* * * * *